(12) United States Patent
Yamamoto et al.

(10) Patent No.: US 7,784,492 B2
(45) Date of Patent: Aug. 31, 2010

(54) DIRECTION CONTROL VALVE

(75) Inventors: Yoshihisa Yamamoto, Kariya (JP);
Hirokuni Tomita, Okazaki (JP);
Yoshihiro Hotta, Nagoya (JP);
Yoshifumi Wakisaka, Aichi-gun (JP);
Kiyomi Kawamura, Nisshin (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 1047 days.

(21) Appl. No.: 11/494,796

(22) Filed: Jul. 28, 2006

(65) Prior Publication Data
US 2007/0023092 A1    Feb. 1, 2007

(30) Foreign Application Priority Data
Jul. 29, 2005    (JP) .............................. 2005-222162

(51) Int. Cl.
*F16K 11/044*    (2006.01)
*F15B 13/042*    (2006.01)

(52) U.S. Cl. .............................. 137/625.27; 137/627.5; 137/596.18

(58) Field of Classification Search ............ 137/625.25, 137/625.27, 630.22, 630.16, 628, 596.18, 137/627.5
See application file for complete search history.

(56) References Cited

U.S. PATENT DOCUMENTS

| | | | | |
|---|---|---|---|---|
| 2,606,739 A | * | 8/1952 | Gardner .................. | 137/596.1 |
| 4,067,357 A | * | 1/1978 | Ruchser .................. | 137/596.16 |
| 4,454,892 A | * | 6/1984 | Chadshay .................... | 137/597 |
| 5,601,116 A | * | 2/1997 | Sell ........................ | 137/625.27 |
| 5,620,027 A | * | 4/1997 | Sato ....................... | 137/625.66 |
| 5,682,918 A | * | 11/1997 | Stoll et al. ............. | 137/596.18 |
| 5,785,299 A | * | 7/1998 | Katsuta et al. ......... | 251/129.18 |
| 6,453,875 B1 | | 9/2002 | Mahr et al. | |
| 6,871,636 B2 | | 3/2005 | Boecking | |
| 6,892,703 B2 | | 5/2005 | Magel | |
| 6,935,374 B2 | * | 8/2005 | Yamamoto ................ | 137/627.5 |

FOREIGN PATENT DOCUMENTS

| JP | 2001-090634 | 4/2001 |
|---|---|---|
| JP | 2002-227747 | 8/2002 |

* cited by examiner

*Primary Examiner*—John Rivell
(74) *Attorney, Agent, or Firm*—Nixon & Vanderhye PC

(57) ABSTRACT

In a direction control valve, a bottom face of an insertion hole of a first movable member is at a predetermined distance from a second movable member with respect to a first axial direction when communication between a first communication switching port and a communication object port is made and communication between a second communication switching port and the communication object port is broken. The bottom face contacts and pushes the second movable member in a second axial direction opposite to the first axial direction after the first movable member moves in the second axial direction by the predetermined distance while the first and second movable members move in the second axial direction to switch a port communicating with the communication object port from the first communication switching port to the second communication switching port.

11 Claims, 14 Drawing Sheets

DIRECTION CONTROL VALVE

CROSS REFERENCE TO RELATED APPLICATION

This application is based on and incorporates herein by reference Japanese Patent Application No. 2005-222162 filed on Jul. 29, 2005.

BACKGROUND OF THE INVENTION

1. Field of the Invention

The present invention relates to a direction control valve, and more particularly to a direction control valve equipped with a valve body, which is formed with first and second communication switching ports and a communication object port, and a movable member axially moving inside the valve body to switch a port communicating with the communication object port between the first communication switching port and the second communication switching port.

2. Description of Related Art

FIG. 13 illustrates an example structure of this type of direction control valve. The direction control valve shown in FIG. 13 is a three-way valve having a valve body 110 and a movable member 112. The valve body 110 is formed with communication switching ports 110a, 110b and a communication object port 110c. The movable member 112 moves in the valve body 110 in a direction parallel to a axis 116 (in axial direction) of the valve body 110 to switch a port communicating with the communication object port 110c between the communication switching ports 110a, 110b. A hydraulic oil pressure PL is supplied to the communication switching port 110a, and a hydraulic oil pressure Pc is supplied to the communication switching port 110b. The communication object port 110c is connected to a switch chamber (S.C., not shown). In this example, the pressure Pc supplied to the communication switching port 110b is set higher than the pressure PL supplied to the communication switching port 110a. A control chamber 118 is defined by an inner peripheral surface of the valve body 110 and an end face of the movable member 112 opposite from the communication switching port 110b with respect to the axial direction. The hydraulic oil pressure supplied to the control chamber 118 produces a thrust acting on the movable member 112 toward the communication switching port 110b in the axial direction. The pressure in the control chamber 118 is controlled by opening and closing operation of a pilot valve 120. A spring 126 applies a biasing force to the movable member 112 in the axial direction away from the communication switching port 110b. Hereinafter, the axial direction away from the communication switching port 110b will be referred to as a first axial direction and the axial direction opposite to the first axial direction will be referred to as a second axial direction.

When the pilot valve 120 is closed, the pressure in the control chamber 118 pushes the movable member 112 in the second axial direction, so the movable member 112 closely contacts a seat 110d formed on the inner peripheral surface of the valve body 110. Thus, communication between the communication switching port 110b and the communication object port 110c is provided and communication between the communication switching port 110a and the communication object port 110c is broken, so the resulting pressure in the switch chamber is the pressure Pc. Then, if the pilot valve 120 is opened, the pressure in the control chamber 118 is reduced, so the movable member 112 separates from the seat 110d and moves in the first axial direction due to the biasing force of the spring 126. As a result, communication between the communication switching port 110a and the communication object port 110c is provided. Then, the movable member 112 closely contacts a seat 110e formed on the inner peripheral surface of the valve body 110, so the communication between the communication switching port 110b and the communication object port 110c is broken. In this manner, the pilot valve 120 is switched from the closed state to the opened state, thereby switching the port communicating with the communication object port 110c from the communication switching port 110b to the communication switching port 110a. As a result, the pressure in the switch chamber reduces from the pressure Pc to the pressure PL.

Then, if the pilot valve 120 is closed, the pressure in the control chamber 118 increases. Accordingly, the movable member 112 separates from the seat 110e and moves in the second axial direction due to the pressure in the control chamber 118. Thus, communication between the communication switching port 110b and the communication object port 110c is provided. Then, if the movable member 112 closely contacts the seat 110d formed on the inner peripheral surface of the valve body 110, the communication between the communication switching port 110a and the communication object port 110c is broken. In this manner, the pilot valve 120 is switched from the opened state to the closed state, thereby switching the port communicating with the communication object port 110c from the communication switching port 110a to the communication switching port 110b. As a result, the pressure in the switch chamber increases from the pressure PL to the pressure Pc. This type of direction control valve is also described in JP-A-2002-227747.

As another background technology, a fuel injection device is described in DE-A-10229419, JP-A-2002-539372, JP-A-2001-90634, or JP-A-2005-500472.

In the direction control valve shown in FIG. 13, there exists a period in which both the communication switching ports 110a, 110b communicate with the communication object port 110c when the port communicating with the communication object port 110c is switched. For example, in the stroke in which the movable member 112 moves in the second axial direction to switch the port communicating with the communication object port 110c from the communication switching port 110a to the communication switching port 110b, the movable member 112 separates from the seat 110e and then closely contacts the seat 110d. Thus, as shown in FIG. 14, both of the communication switching ports 110a, 110b communicate with the communication object port 110c during the period since the movable member 112 separates from the seat 110e until the movable member 112 closely contacts the seat 110d. In consequence, the hydraulic oil supplied to the high-pressure communication switching port 110b flows into the low-pressure communication switching port 110a, resulting in an increase in energy loss of the hydraulic oil.

Likewise, in the stroke in which the movable member 112 moves in the first axial direction to switch the port communicating with the communication object port 110c from the communication switching port 110b to the communication switching port 110a, both of the communication switching ports 110a, 110b communicate with the communication object port 110c during a period since the movable member 112 separates from the seat 110d until the movable member 112 closely contacts the seat 110e. The hydraulic oil supplied to the high-pressure communication switching port 110b flows into the low-pressure communication switching port 110a when the port communicating with the communication object port 110c is switched. In consequence, the energy loss of the hydraulic oil increases.

SUMMARY OF THE INVENTION

It is an object of the present invention to provide a direction control valve reducing an energy loss of a hydraulic fluid when a communicating port is switched.

According to an aspect of the present invention, a direction control valve includes a valve body and a movable member. The valve body is formed with a first communication switching port, a second communication switching port and a communication object port. The movable member moves in the valve body in an axial direction to switch a port communicating with the communication object port between the first communication switching port and the second communication switching port. The movable member includes a first movable member and a second movable member. The first movable member makes communication between the first communication switching port and the communication object port by moving in a first axial direction and breaks the communication between the first communication switching port and the communication object port by moving in a second axial direction opposite to the first axial direction. The second movable member makes communication between the second communication switching port and the communication object port by moving in the second axial direction and breaks the communication between the second communication switching port and the communication object port by moving in the first axial direction. The first movable member has a pushing portion that contacts the second movable member in the second axial direction to apply a pushing force to the second movable member in the second axial direction. The pushing portion is distant from the second movable member by a first predetermined distance with respect to the first axial direction when the communication between the first communication switching port and the communication object port is made and the communication between the second communication switching port and the communication object port is broken. The first movable member pushes the second movable member in the second axial direction after the first movable member moves in the second axial direction by the first predetermined distance in a stroke in which the first and second movable members move in the second axial direction to break the communication between the first communication switching port and the communication object port and to make the communication between the second communication switching port and the communication object port due to a thrust acting on the first movable member in the second axial direction.

Thus, a period in which both of the first and second communication switching ports communicate with the communication object port can be reduced when the port communicating with the communication object port is switched between the first communication switching port and the second communication switching port. As a result, energy loss of a hydraulic fluid produced when the port communicating with the communication object port is switched can be reduced.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
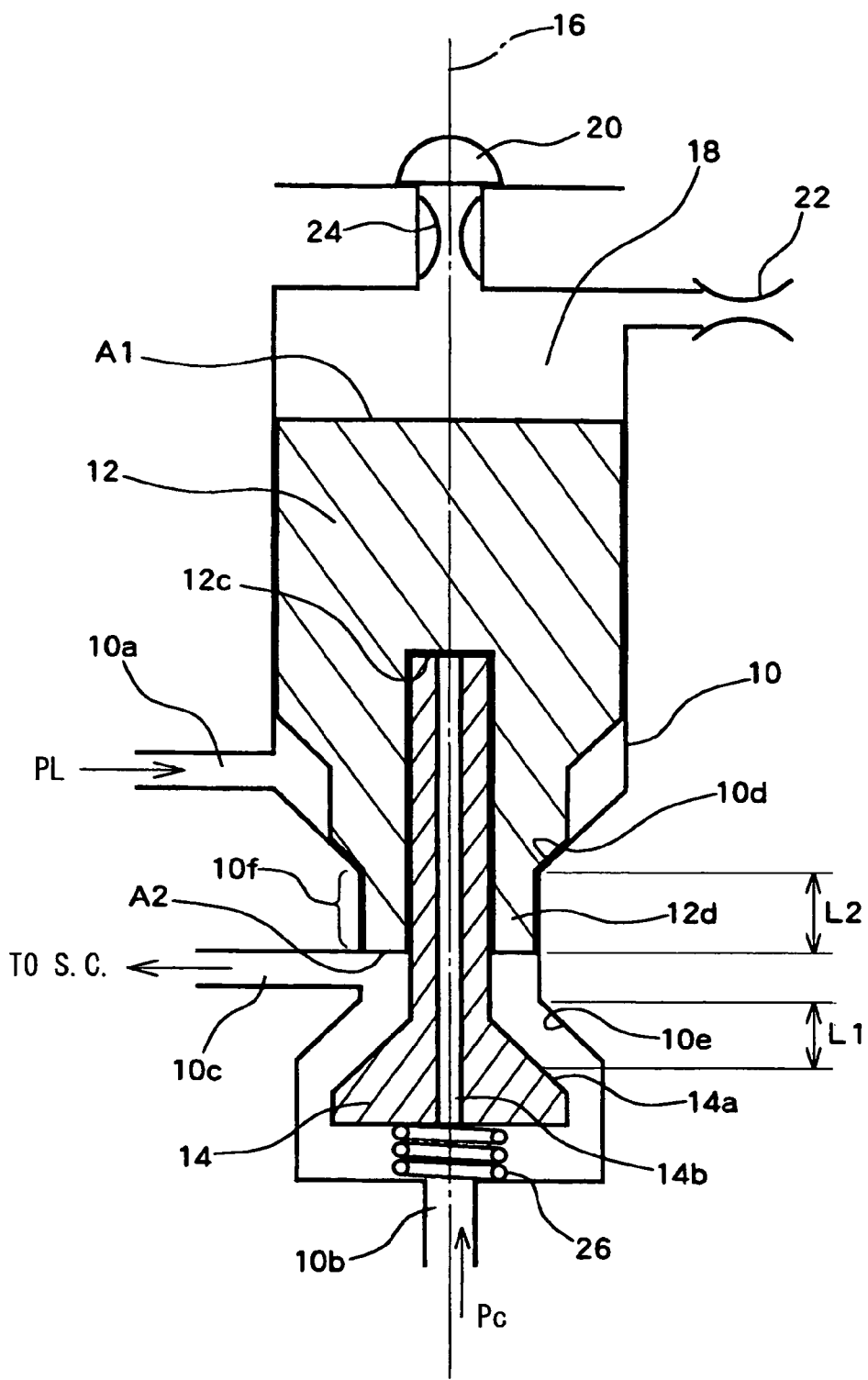
FIG. 1 is a schematic section diagram showing an internal structure of a direction control valve according to an example embodiment of the present invention.

Referring to FIG. 1, a direction control valve according to an example embodiment of the present invention is illustrated. The direction control valve according to the present embodiment has a valve body 10, a first movable member 12 and a second movable member 14. The valve body 10 is formed with a first communication switching port 10a, a second communication switching port 10b, and a communication object port 10c. Hydraulic fluid pressure PL is supplied to the communication switching port 10a, and hydraulic fluid pressure Pc is supplied to the second communication switching port 10b. The communication object port 10c is connected to a switch chamber (S.C., not shown). The pressure Pc supplied to the communication switching port 10b is set higher than the pressure PL supplied to the communication switching port 10a. The hydraulic fluid is an incompressible fluid. For example, hydraulic oil or fuel for an internal combustion engine may be used as the hydraulic fluid.

Figure 2:
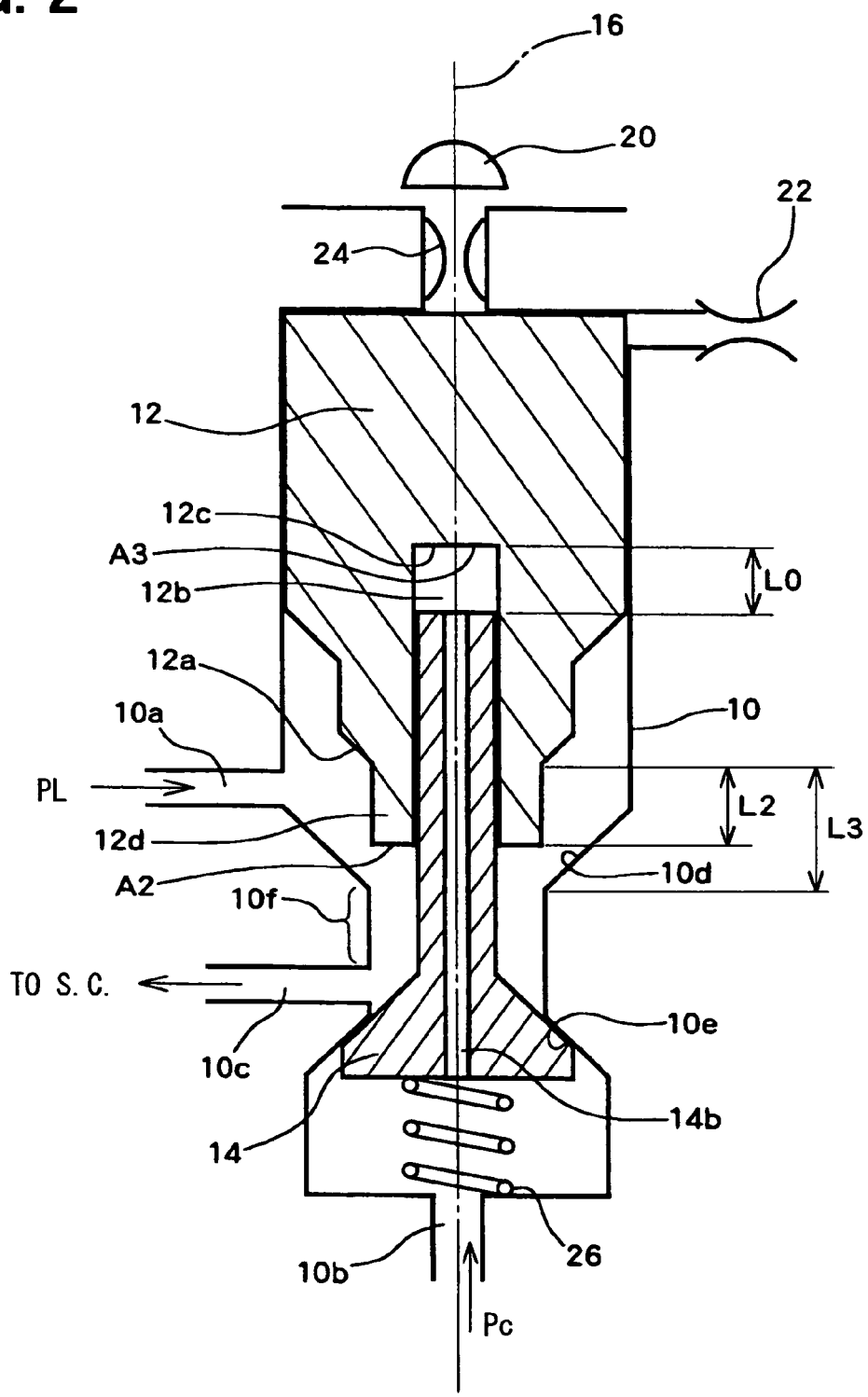
FIG. 2 is a schematic section diagram showing the direction control valve according to the FIG. 1 embodiment.

The movable members 12, 14 move in the valve body 10 along a direction parallel to an axis 16 (in axial direction) of the movable members 12, 14 to switch the port communicating with the communication object port 10c between the communication switching port 10a and the communication switching port 10*b*. When communication between the communication switching port 10*a* and the communication object port 10*c* is provided and the communication between the communication switching port 10*b* and the communication object port 10*c* is broken as shown in FIG. 2, the hydraulic fluid pressure PL is supplied from the communication switching port 10*a* to the communication object port 10*c*, i.e., to the switch chamber. When communication between the communication switching port 10*b* and the communication object port 10*c* is provided and the communication between the communication switching port 10*a* and the communication object port 10*c* is broken as shown in FIG. 1, the hydraulic fluid pressure Pc is supplied from the communication switching port 10*b* to the communication object port 10*c*, i.e., to the switch chamber. Thus, the direction control valve according to the present embodiment is a three-way valve capable of switching the port communicating with the communication object port 10*c* (or switch chamber) between the communication switching port 10*a* and the communication switching port 10*b*. The communication switching port 10*a*, the communication object port 10*c* and the communication switching port 10*b* are located in this order along a direction from an upper side toward a lower side of the valve body 10 in FIG. 1 or 2 with respect to the axial direction. However, the vertical direction in FIG. 1 or 2 is not related with an actual mounting direction of the direction control valve.

The movable member 12 moves in the axial direction away from the communication switching port 10*b* to make the communication between the communication switching port 10*a* and the communication object port 10*c*. Hereinafter, the axial direction away from the communication switching port 10*b* will be referred to as a first axial direction. The movable member 12 moves in a second axial direction opposite to the first axial direction to break the communication between the communication switching port 10*a* and the communication object port 10*c*. The movable member 14 moves in the second axial direction to make the communication between the communication switching port 10*b* and the communication object port 10*c*. The movable member 14 moves in the first axial direction to break the communication between the communication switching port 10*b* and the communication object port 10*c*.

A first seat 10*d* is formed on an inner peripheral surface of the valve body 10 by reducing a diameter of the inner peripheral surface of the valve body 10 along the second axial direction between the communication switching port 10*a* and the communication object port 10*c*. A second seat 10*e* is formed on the inner peripheral surface of the valve body 10 by reducing the diameter of the inner peripheral surface of the valve body 10 between the communication switching port 10*b* and the communication object port 10*c* along the first axial direction. The seat 10*d* is located between the communication switching port 10*a* and the communication object port 10*c* with respect to the axial direction. The seat 10*e* is located between the communication object port 10*c* and the communication switching port 10*b* with respect to the axial direction.

The movable member 12 is formed with a first contact portion 12*a* having an outer peripheral surface, a diameter of which reduces along the second axial direction. The contact portion 12*a* closely contacts the seat 10*d* in the second axial direction to break the communication between the communication switching port 10*a* and the communication object port 10*c*. The movable member 12 contacts the seat 10*d* at the contact portion 12*a*. Thus, the further movement of the movable member 12 in the second axial direction is restrained. The movable member 14 is formed with a second contact portion 14*a* having an outer peripheral surface, a diameter of which gradually reduces along the first axial direction. The contact portion 14*a* contacts the seat 10*e* in the first axial direction to break the communication between the communication switching port 10*b* and the communication object port 10*c*. The movable member 14 contacts the seat 10*e* at the contact portion 14*a*. Thus, further movement of the movable member 14 in the first axial direction is restrained.

A control chamber 18 is provided by the inner peripheral surface of the valve body 10 and an end face of the movable member 12 opposite from the communication switching port 10*b* with respect to the axial direction. Hydraulic fluid pressure supplied to the control chamber 18 through an inlet orifice 22 applies a thrust to the movable member 12 in the second axial direction. The hydraulic fluid pressure Pc is supplied to the inlet orifice 22 as well as the communication switching port 10*b*. The thrust applied to the movable member 12 in the second axial direction is controlled by controlling the hydraulic fluid pressure in the control chamber 18 through opening/closing control of a pilot valve 20. If the pilot valve 20 is closed to break the discharge of the hydraulic fluid from the control chamber 18 through an outlet orifice 24, the pressure in the control chamber 18 is controlled to the pressure Pc and the thrust applied to the movable member 12 in the second axial direction is controlled to a product of the pressure Pc and an area A1 (Pc×A1). The area A1 is an area of a surface of the movable member 12, to which the pressure in the control chamber 18 is applied in the second axial direction. If the pilot valve 20 is opened to allow the discharge of the hydraulic fluid from the control chamber 18 through the outlet orifice 24, the pressure in the control chamber 18 is controlled to pressure Pm lower that the pressure Pc (Pm<Pc) and the thrust applied to the movable member 12 in the second axial direction is controlled to a product of the pressure Pm and the area A1 (Pm×A1). The opening/closing operation of the pilot valve 20 can be performed, e.g., by an electromagnetic force and requires only a small driving force. The value of the pressure Pm can be adjusted by the setting of the diameter of the inlet orifice 22, the diameter of the outlet orifice 24 and an opening degree of the pilot valve 20. The outlet orifice 24 is provided for precisely setting a sectional area of the flow path at the time when the pilot valve 20 is opened. The outlet orifice 24 can be omitted.

In the present embodiment, the movable member 12 is formed with an insertion hole 12*b* opening in its end face on the communication switching port 10*b* side. The movable member 14 is inserted into the insertion hole 12*b* in the first axial direction such that the movable member 14 can slide on the inner peripheral surface of the insertion hole 12*b* in the axial direction. The movable member 14 is formed with a through hole 14*b* opening in its both end faces with respect to the axial direction. The through hole 14*b* provides communication between the communication switching port 10*b* and the insertion hole 12*b* (more specifically, a space formed by inserting the movable member 14 into the insertion hole 12*b*).

The central axes of the insertion hole 12*b* and the through hole 14*b* coincide with the axis 16 of the movable members 12, 14. The movable member 12 receives the hydraulic fluid pressure Pc supplied from the communication switching port 10*b* in the first axial direction at a bottom face 12*c* of the insertion hole 12*b*. Accordingly, a force as a product of the pressure Pc and an area A3 of the bottom face 12*c* of the insertion hole 12*b* is applied to the movable member 12 in the first axial direction. The bottom face 12*c* of the insertion hole 12*b* of the movable member 12 can contact the movable member 14 in the second axial direction to apply a pushing force to the movable member 14 in the second axial direction.

In a state shown in FIG. 2, the communication between the communication switching port 10a and the communication object port 10c is provided and the communication between the communication switching port 10b and the communication object port 10c is broken. The depth of the insertion hole 12b of the movable member 12 and the length of the movable member 14 in the axial direction are set such that the bottom face 12c of the insertion hole 12b of the movable member 12 is distant from the movable member 14 by a predetermined distance L0 in the first axial direction in the state shown in FIG. 2. The predetermined distance L0 is set shorter than a stroke distance L3 of axial movement of the movable member 12, i.e., a lifting amount L3 of the movable member 12. Therefore, in the stroke of the movable members 12, 14 in the second axial direction, i.e., in shifting stroke from the state shown in FIG. 2 to the state shown in FIG. 1, for breaking the communication between the communication switching port 10a and the communication object port 10c and for providing the communication between the communication switching port 10b and the communication object port 10c, the movable member 12 moves by the predetermined distance L0 in the second axial direction. Then, the bottom face 12c of the insertion hole 12b contacts the movable member 14 so as to push the movable member 14 in the second axial direction. Then, the pushed movable member 14 moves together with the movable member 12 in the second axial direction. A stroke distance L1 of the axial movement of the movable member 14, i.e., a lifting amount of the movable member 14 in the axial direction, is provided by subtracting the distance L0 from the stroke distance L3 of the axial movement of the movable member 12 and is shorter than the stroke distance L3.

The movable member 12 according to the present embodiment has a sliding block portion 12d that abuts the contact portion 12a on the communication switching port 10b side with respect to the axial direction. The sliding block portion 12d is formed to block the passage between the communication switching port 10a and the communication object port 10c. The valve body 10 has a fitting portion 10f between the seat 10d and the communication object port 10c with respect to the axial direction. The sliding block portion 12d can be fitted into the fitting portion 10f. The sliding block portion 12d has a predetermined axial length L2. When the distance between the seat 10d and the contact portion 12a of the movable member 12 is equal to or shorter than the predetermined length L2, the sliding block portion 12d is fitted into the fitting portion 10f in the second axial direction. Thus, the passage between the communication switching port 10a and the communication object port 10c is blocked at a position between the seat 10d and the communication object port 10c with respect to the axial direction. The predetermined axial length L2 of the sliding block portion 12d is set longer than the stroke distance L1 of the movement of the movable member 14 in the axial direction and shorter than the stroke distance L3 of the movement of the movable member 12 in the axial direction.

The movable member 12 receives hydraulic fluid pressure Pd supplied from the communication object port 10c in the first axial direction at the end face of the sliding block portion 12d on the communication switching port 10b side. As a result, a force as a product of the pressure Pd and an area A2 of the end face of the sliding block portion 12d on the communication switching port 10b side is applied to the movable member 12 in the first axial direction. A spring 26 applies a biasing force F to the movable member 14 in the first axial direction.

In the present embodiment, the values of the biasing force F of the spring 26, the pressure Pm and the areas A1, A2, A3 are set to satisfy following expressions (1) to (3).

$$Pc \times A1 > Pc \times (A2+A3)+F \quad (1)$$

$$Pm \times A1 < Pc \times (A2+A3)+F \quad (2)$$

$$Pm \times A1 < PL \times A2 + Pc \times A3 \quad (3)$$

Next, an operation of the direction control valve according to the present embodiment, particularly, an operation of switching the port communicating with the communication object port 10c between the communication switching port 10a and the communication switching port 10b, will be described. In the present embodiment, the port communicating with the communication object port 10c is switched between the communication switching port 10a and the communication switching port 10b by adjusting the thrust applied to the movable member 12 in the second axial direction.

When the pilot valve 20 is closed, the pressure in the control chamber 18 is controlled at the pressure Pc. In this state, the movable member 12 is pressed in the second axial direction by a thrust as a product of the pressure Pc and the area A1. The sliding block portion 12d is fitted into the fitting portion 10f and the contact portion 12a closely contacts the seat 10d as shown in FIG. 1 because the values of the biasing force of the spring 26 and the areas A1, A2, A3 are set to satisfy the expression (1). Accordingly, the communication between the communication switching port 10a and the communication object port 10c is broken. Further, because the predetermined distance L0 is set shorter than the stroke distance L3 of the axial movement of the movable member 12, the bottom face 12c of the insertion hole 12b of the movable member 12 contacts the movable member 14 so as to push the movable member 14 in the second axial direction in a state in which the contact portion 12a of the movable member 12 closely contacts the seat 10d as shown in FIG. 1. Thus, the contact portion 14a of the movable member 14 is away from the seat 10e so as to provide the communication between the communication switching port 10b and the communication object port 10c. Thus, when the pilot valve 20 is closed, the communication between the communication switching port 10b and the communication object port 10c is provided and the communication between the communication switching port 10a and the communication object port 10c is broken. As a result, the pressure in the switch chamber becomes the pressure Pc.

Figure 3:
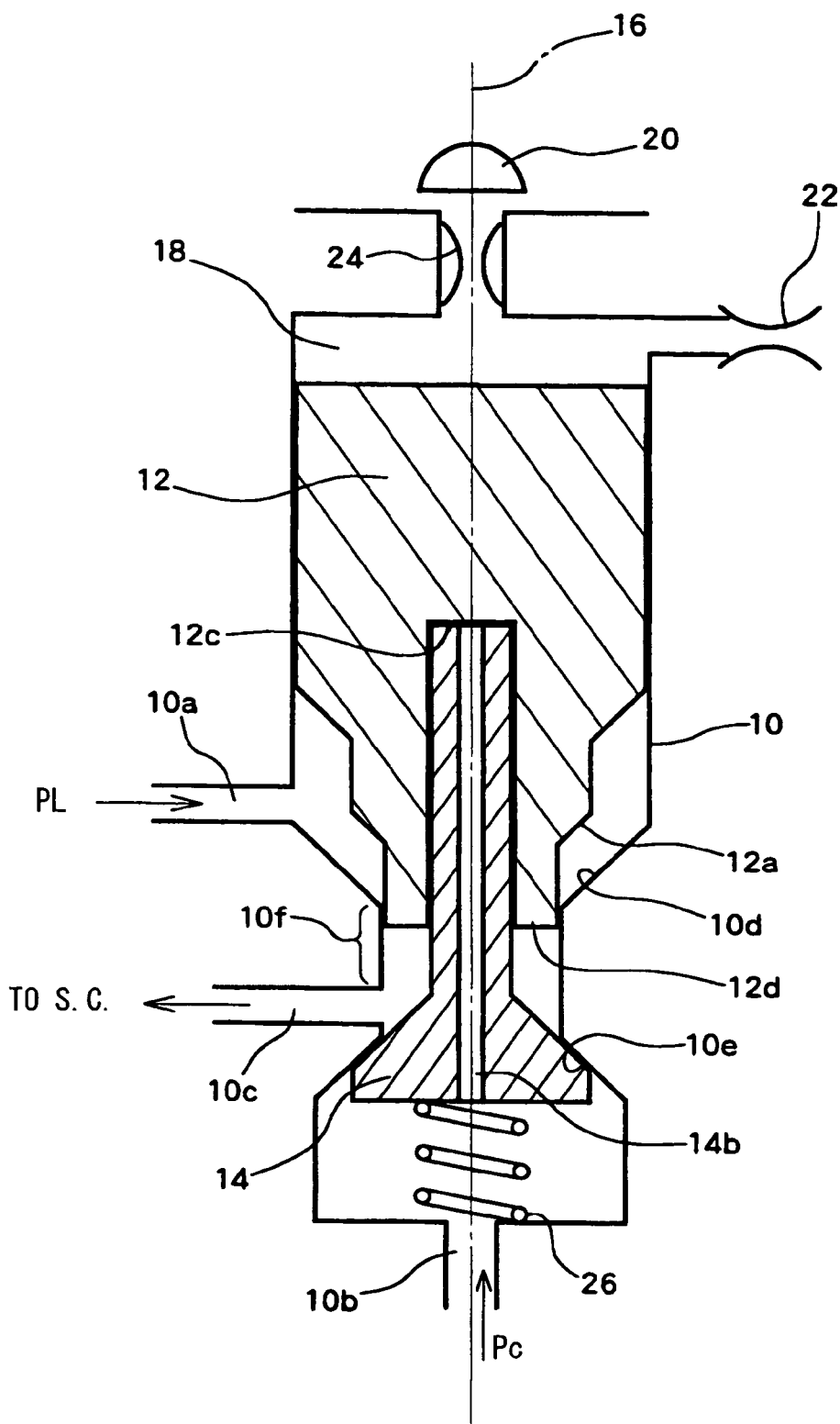
FIG. 3 is a schematic section diagram showing the direction control valve according to the FIG. 1 embodiment.

Then, if the pilot valve 20 is opened, the pressure in the control chamber 18 is reduced from the pressure Pc and is controlled at the pressure Pm. Because the values of the biasing force F of the spring 26, the pressure Pm and the areas A1, A2, A3 are set to satisfy the expression (2), the movable members 12, 14 are pressed to start moving in the first axial direction. As shown in FIG. 3, the movable member 14 is moved by the biasing force F of the spring 26 by the stroke distance L1 in the first axial direction, so the contact portion 14a contacts the seat 10e. Thus, the communication between the communication switching port 10b and the communication object port 10c is broken.

As for the movable member 12, even after the contact portion 12a separates from the seat 10d, the sliding block portion 12d is fitted in the fitting portion 10f. In this situation, the passage between the communication switching port 10a and the communication object port 10c is broken by the sliding block portion 12d, resulting in the absence of communication between the communication switching port 10a and the communication object port 10c. Because the axial length L2 of the sliding block portion 12d is set longer than the stroke distance L1 of the movable member 14, a part of the sliding block portion 12d is fitted in the fitting portion 10f even if the contact portion 14a of the movable member 14 contacts the seat 10e so as to break the communication between the communication switching port 10b and the communication object port 10c as shown in FIG. 3. As a result, the communication between the communication switching port 10a and the communication object port 10c is not yet made.

Even after the contact portion 14a of the movable member 14 contacts the seat 10e and further movement of the movable member 14 in the first axial direction is restrained, the movable member 12 continues sliding in the first axial direction on the inner peripheral face of the valve body 10. As a result, the bottom face 12c of the insertion hole 12b of the movable member 12 moves away from the movable member 14 in the first axial direction. Then, when the contact portion 12a of the movable member 12 moves away from the seat 10d in the first axial direction by more than the predetermined length L2, the sliding block portion 12d comes out of the fitting portion 10f. As a result, communication between the communication switching port 10a and the communication object port 10c is started.

Because the values of the pressure Pm and the areas A1, A2, A3 are set to satisfy the expression (3), the movable member 12 continues sliding further in the first axial direction as shown in FIG. 2, so the communication between the communication switching port 10a and the communication object port 10c is completely made. The distance between the movable member 14 and the bottom face 12c of the insertion hole 12b of the movable member 12 becomes the distance L0. In this manner, by switching the pilot valve 20 from the closed state to the opened state, the port communicating with the communication object port 10c is switched from the communication switching port 10b to the communication switching port 10a. In consequence, the pressure in the switch chamber is successfully reduced from the pressure Pc to the pressure PL.

Then, if the pilot valve 20 is closed, the pressure in the control chamber 18 increases from the pressure Pm and is controlled at the pressure Pc. Thus, the thrust as a product of the pressure Pc and the area A1 causes the movable member 12 to slide in the second axial direction. The biasing force F of the spring 26 causes the movable member 14 to keep the contact portion 14a in close contact with the seat 10e. With the sliding of the movable member 12, the hydraulic fluid in the insertion hole 12b is increasingly discharged through the through hole 14b. Hence, even when the movable member 12 starts sliding in the second axial direction, the communication between the communication switching port 10b and the communication object port 10c is not yet made. The axial length L2 of the sliding block portion 12d is set longer than the stroke distance L1 (=L3−L0) of the movable member 14. Even if the distance between the seat 10d and the contact portion 12a of the movable member 12 becomes shorter than the predetermined length L2 and the sliding block portion 12d starts to be fitted into the fitting portion 10f, the moving distance of the movable member 12 in the second axial direction is shorter than the predetermined distance L0. Therefore, the bottom face 12c of the insertion hole 12b is still separate from the movable member 14. As a result, the sliding block portion 12d prevents the communication between the communication switching port 10a and the communication object port 10c before the communication between the communication switching port 10b and the communication object port 10c is made.

Figure 4:
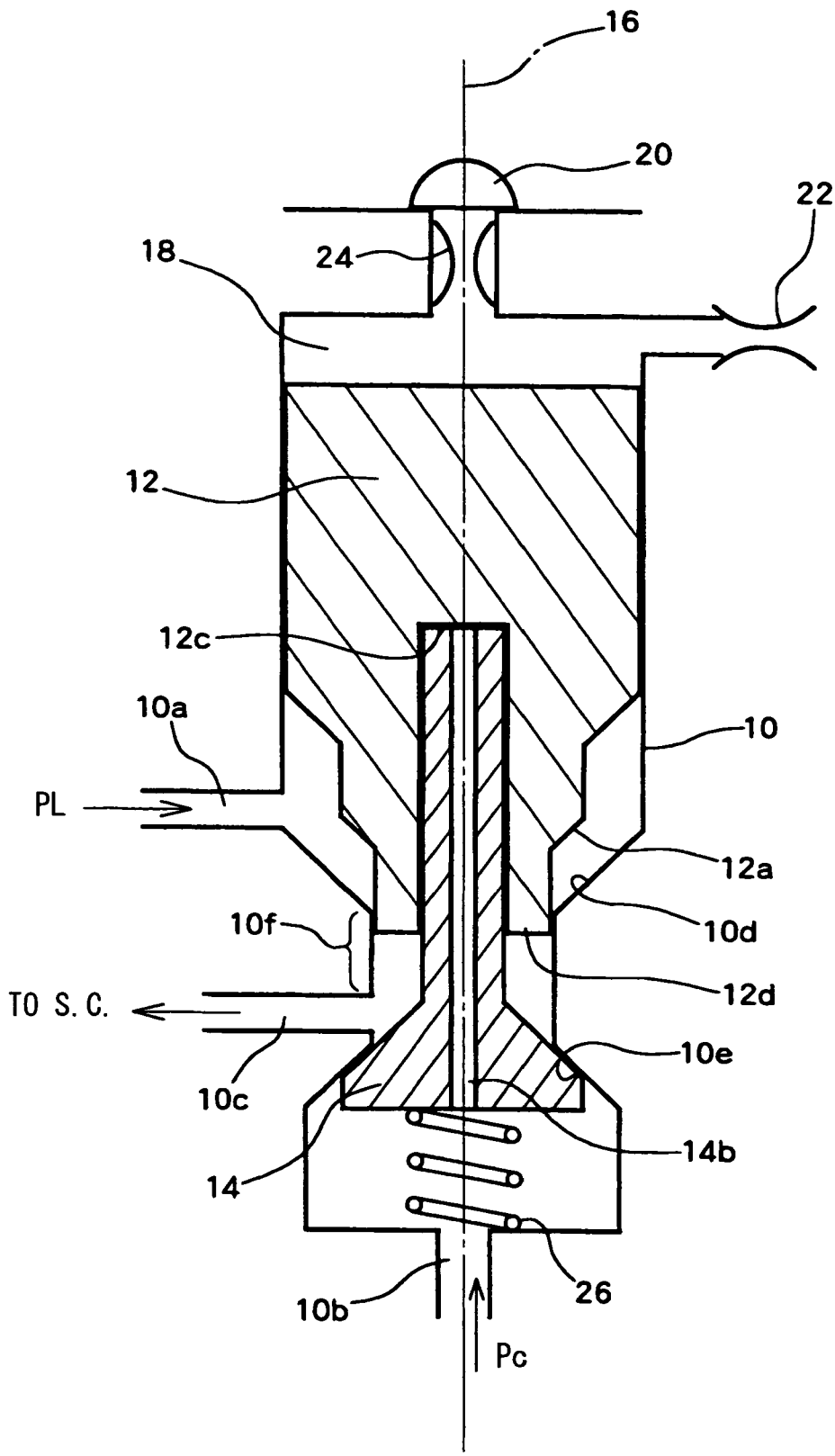
FIG. 4 is a schematic section diagram showing the direction control valve according to the FIG. 1 embodiment.

The bottom face 12c of the insertion hole 12b of the movable member 12 contacts the movable member 14 as shown in FIG. 4 if the moving distance of the movable member 12 in the second axial direction reaches the predetermined distance L0 after the sliding block portion 12d starts to be fitted into the fitting portion 10f. Then, the movable member 12 presses the movable member 14 contacting the bottom face 12c of the insertion hole 12b in the second axial direction. The movable member 14 moves together with the movable member 12 in the second axial direction. As a result, as shown in FIG. 1, the contact portion 14a of the movable member 14 separates from the seat 10e so as to make the communication between the communication switching port 10b and the communication object port 10c. The movable members 12, 14 continuously move in the second axial direction until the contact portion 12a of the movable member 12 contacts the seat 10d. Thus, by switching the pilot valve 20 from the opened state to the closed state, the port communicating with the communication object port 10c is switched from the communication switching port 10a to the communication switching port 10b. In consequence, the pressure in the switch chamber is increased from the pressure PL to pressure Pc.

Next, results of analysis conducted by the inventors of the present invention will be described.

Figure 5:
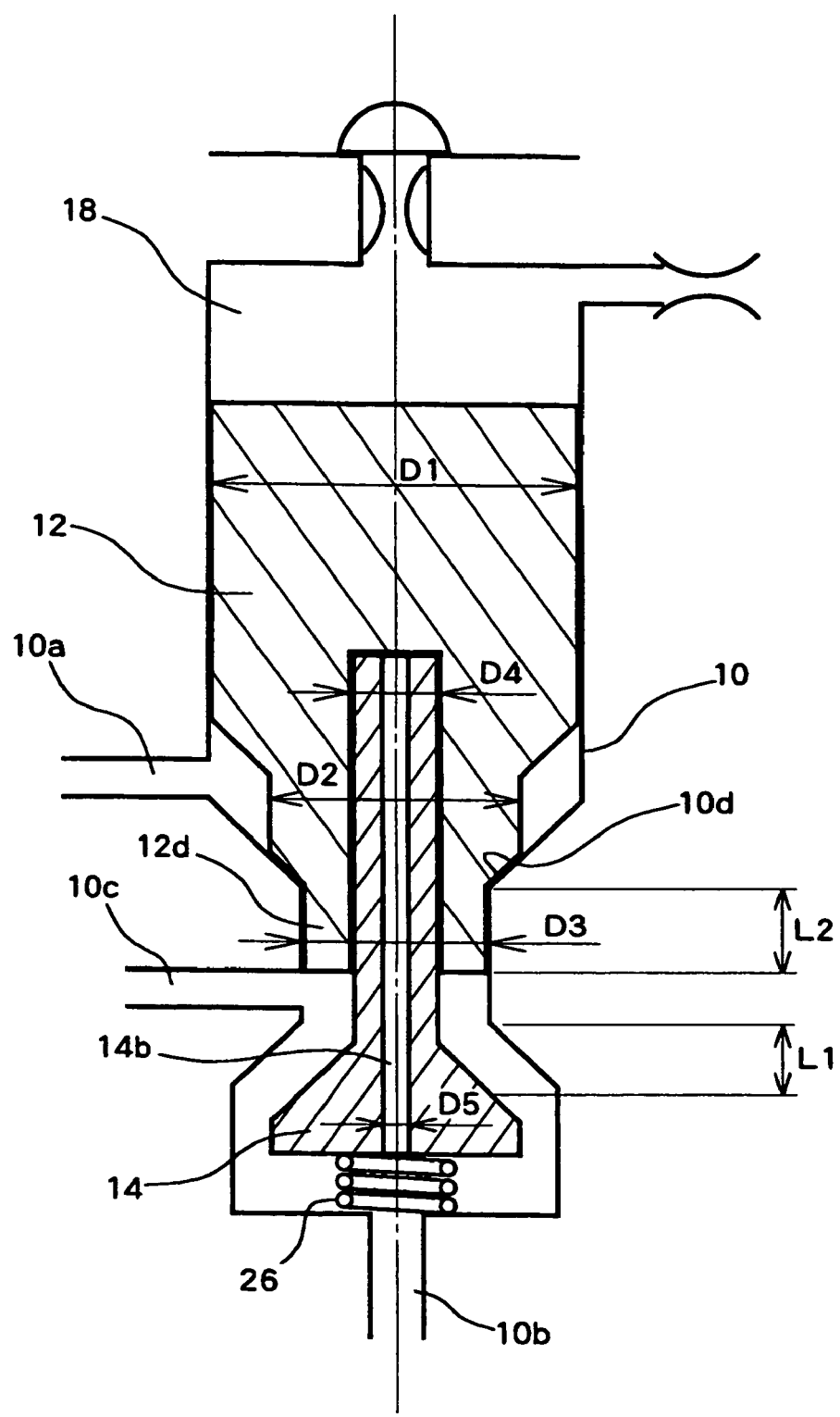
FIG. 5 is a schematic section diagram showing the direction control valve according to the FIG. 1 embodiment.
Figure 6:
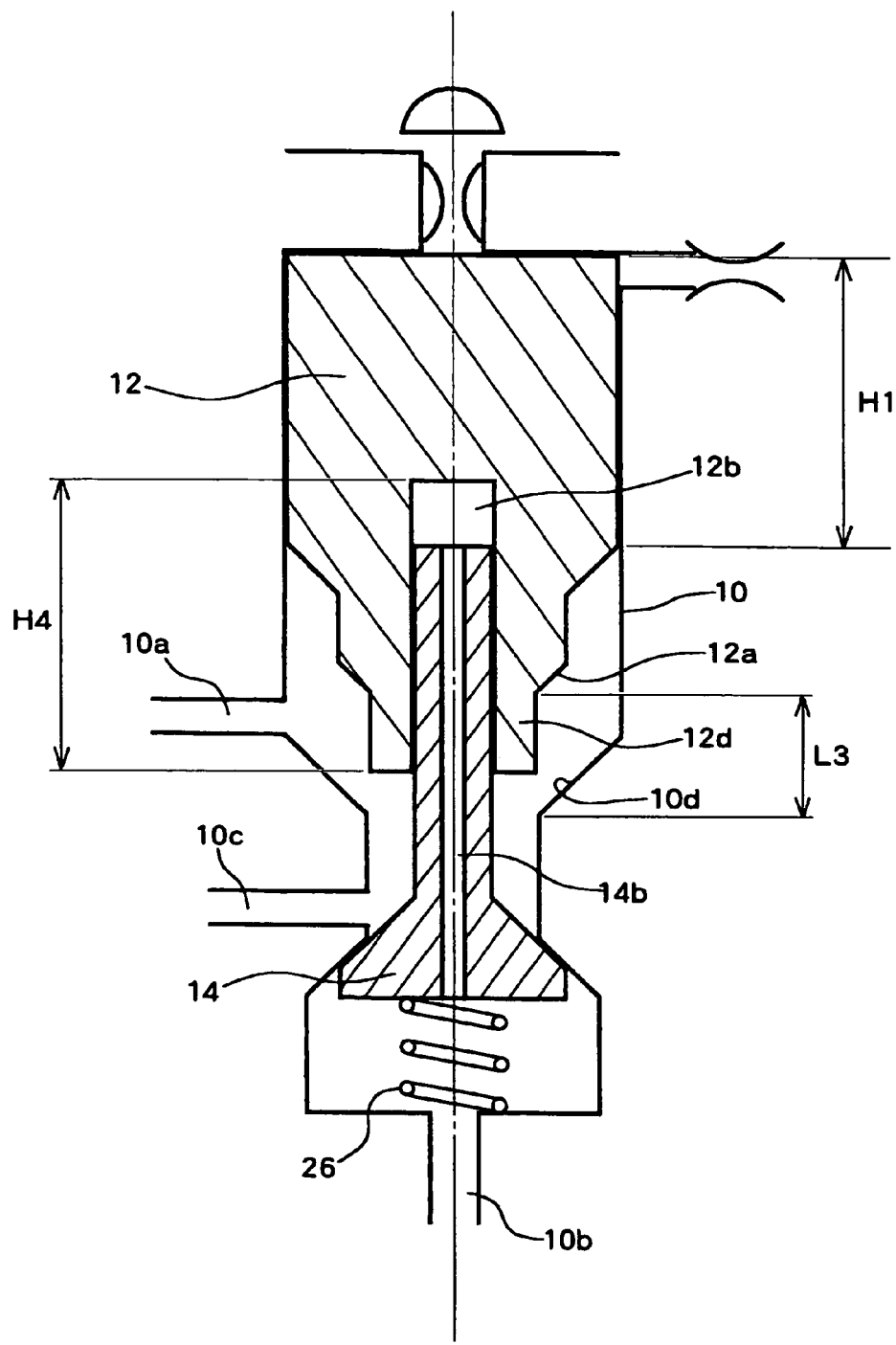
FIG. 6 is a schematic section diagram showing the direction control valve according to the FIG. 1 embodiment.

The direction control valve as an object of the analysis is configured as follows. As shown in FIGS. 5 and 6, regarding the measurements of the movable member 12, the diameter D1 of the portion receiving the pressure in the control chamber 18 is d (d is a constant). The diameter D2 of the portion forming the passage between the communication switching port 10a and the communication object port 10c is 0.9×d. The diameter D3 of the sliding block portion 12d is 0.8×d. The axial length L2 of the sliding block portion 12d is 1.2×L (L is a constant). The diameter D4 of the insertion hole 12b is 0.5×d. The depth (sliding length) H4 of the insertion hole 12b is 80×L. The sliding length H1 of the portion that has the diameter D1 (=d) and slides on the inner peripheral face of the valve body 10 is 46×L. Regarding the measurements of the movable member 14, the diameter D5 of the through hole 14b is 0.2×d. The stroke distance (lifting distance of the movable member 12) L3 at the time when the movable member 12 moves in the axial direction is 2.2×L. The stroke distance (lifting distance of the movable member 14) L1 at the time when the movable member 14 moves in the axial direction is L. The preload of the spring 26 at the time when the contact portion 12a of the movable member 12 is in contact with the seat 10d is 30[N].

Figure 7:
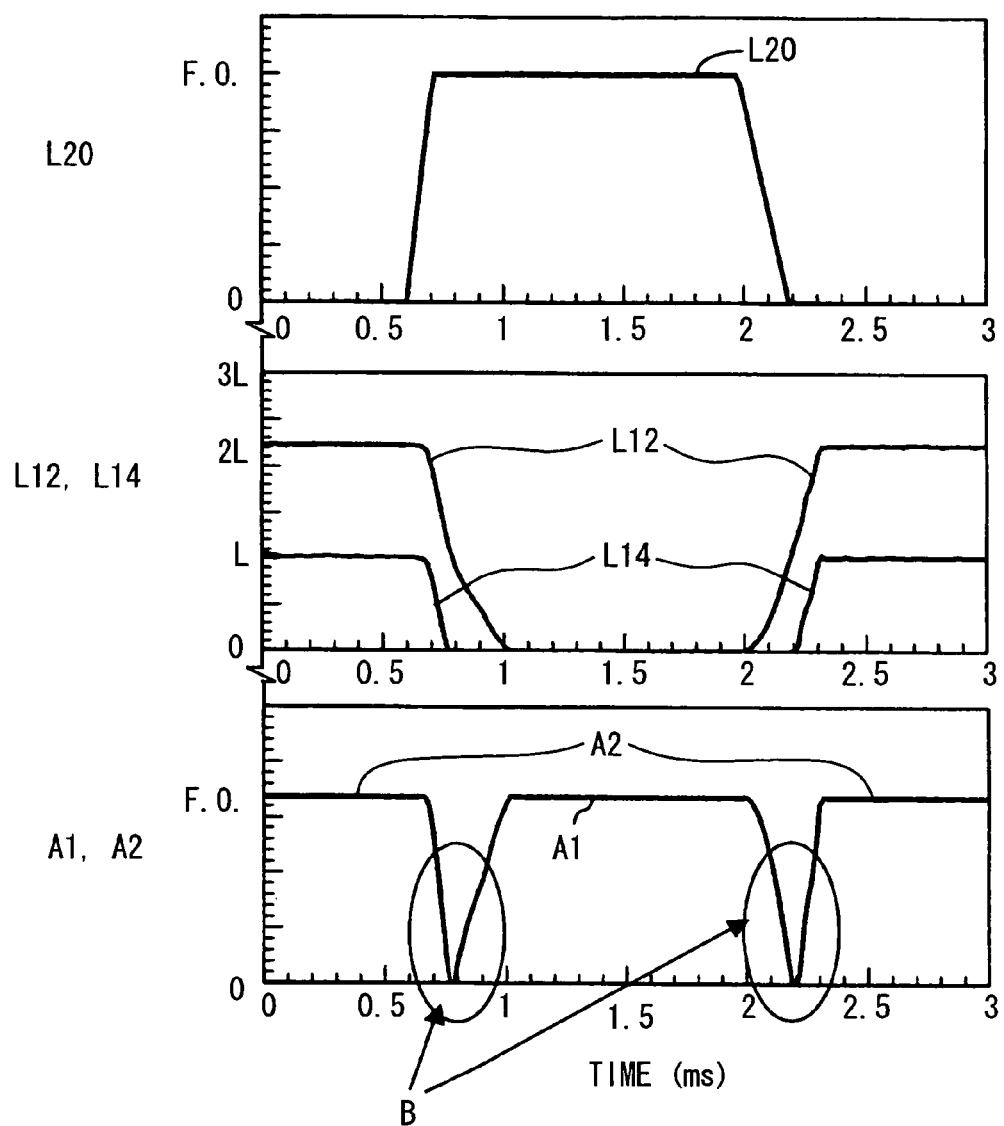
FIG. 7 is a graph showing results of analysis of an operation of the direction control valve according to the FIG. 1 embodiment.

FIG. 7 shows results of calculation of an operation of the direction control valve having the above-described configuration executed by using commercially available software for general-purpose calculation. A solid line L20 in FIG. 7 is a time-series waveform representing the lifting distance L20 of the pilot valve 20. Solid lines L12, L14 in FIG. 7 are time-series waveforms respectively representing the displacement values of the movable members 12, 14 in the axial direction. The displacement values L12, L14 are zero when the pilot valve 20 is in the fully opened state (indicated as F.O. in FIG. 7). Solid lines A1 A2 in FIG. 7 are time-series waveforms respectively representing the opening area between the communication switching port 10a and the communication object port 10c and the opening area between the communication switching port 10b and the communication object port 10c. As shown by areas B in FIG. 7, in both the cases where the pilot valve 20 is switched from the fully closed state to the fully opened state and where the pilot valve 20 is switched from the fully opened state to the fully closed state, both the communication switching ports 10a, 10b are prevented from simultaneously communicating with the communication object port 10c. Thus, overlap between the opening areas is prevented.

According to the foregoing example embodiment, in the stroke of the movement of the movable members 12, 14 in the second axial direction for breaking the communication between the communication switching port 10a and the communication object port 10c and for making the communication between the communication switching port 10b and the communication object port 10c, the movable member 12 moves by the predetermined distance L0 in the second axial direction, and then the bottom face 12c of the insertion hole 12b contacts the movable member 14 to push the movable member 14 in the second axial direction. Thus, the start timing of the movement of the movable member 14, i.e., the start timing of the communication between the communication switching port 10b and the communication object port 10c is lagged behind the start timing of the movement of the movable member 12. Accordingly, the communication switching ports 10a, 10b are restrained from simultaneously communicating with the communication object port 10c. In consequence, when the port communicating with the communication object port 10c is switched from the communication switching port 10a to the communication switching port 10b, the hydraulic fluid supplied to the high-pressure communication switching port 10b is effectively restrained from flowing into the low-pressure communication switching port 10a. As a result, an energy loss of the hydraulic fluid can be inhibited.

In the present embodiment, the sliding block portion 12d is inserted in the fitting portion 10f to break the communication between the communication switching port 10a and the communication object port 10c before the bottom face 12c of the insertion hole 12b of the movable member 12 contacts the movable member 14. Accordingly, the communication between the communication switching port 10b and the communication object port 10c is made after breaking the communication between the communication switching port 10a and the communication object port 10c. The simultaneous communication of both the communication switching ports 10a, 10b with the communication object port 10c is prevented. In consequence, the energy loss of hydraulic fluid produced when the port communicating with the communication object port 10c is switched from the communication switching port 10a to the communication switching port 10b can be eliminated.

According to the present embodiment, in the stroke of the movement of the movable members 12, 14 in the first axial direction for breaking the communication between the communication switching port 10b and the communication object port 10c and for making the communication between the communication switching port 10a and the communication object port 10c, the contact portion 12a separates from the seat 10d in the first axial direction by more than predetermined length L2, and then the sliding block portion 12d makes the communication between the communication switching port 10a and the communication object port 10c. Thus, the start timing of the communication between the communication switching port 10a and the communication object port 10c can be lagged behind the start timing of movement of the movable member 14. This restrains both the communication switching ports 10a, 10b from simultaneously communicating with the communication object port 10c. In consequence, the energy loss of the hydraulic fluid produced when the port communicating with the communication object port 10c is switched from the communication switching port 10b to the communication switching port 10a is eliminated.

Further, in the present embodiment, the axial length L2 of the sliding block portion 12d is set longer than the stroke distance L1 of the movable member 14. Accordingly, the sliding block portion 12d comes out of the fitting portion 10f after the contact portion 14a of the movable member 14 contacts the seat 10e. Thus, the communication between the communication switching port 10a and the communication object port 10c is made after the communication between the communication switching port 10b and the communication object port 10c is broken. That is, the simultaneous communication of both the communication switching ports 10a, 10b with the communication object port 10c is prevented. In consequence, the energy loss of hydraulic fluid produced when the port communicating with the communication object port 10c is switched from the communication switching port 10b to the communication switching port 10a can be eliminated.

As described above, according to the present embodiment, the simultaneous communication of both of the communication switching ports 10a, 10b with the communication object port 10c is effectively prevented not only when the port communicating with the communication object port 10c is switched from the communication switching port 10a to the communication switching port 10b but also when the port communicating with the communication object port 10c is switched from the communication switching port 10b to the communication switching port 10a, resulting in significant reduction of the energy loss of hydraulic fluid.

Next, modified examples of the above-described embodiment will be described. In the above-described embodiment, the sliding block portion 12d is provided on the movable member 12. Alternatively, the sliding block portion 12d may be provided on the movable member 14 at a farther position from the communication switching port 10b than the contact portion 14a with respect to the axial direction. In this case, the axial length L2 of the sliding block portion 12d is set shorter than the stroke distance L1 of the axial movement of the movable member 14. As a result, a period in which both of the communication switching ports 10a, 10b are open can be shortened, resulting in a significant reduction in the energy loss of hydraulic fluid.

Figure 8A:
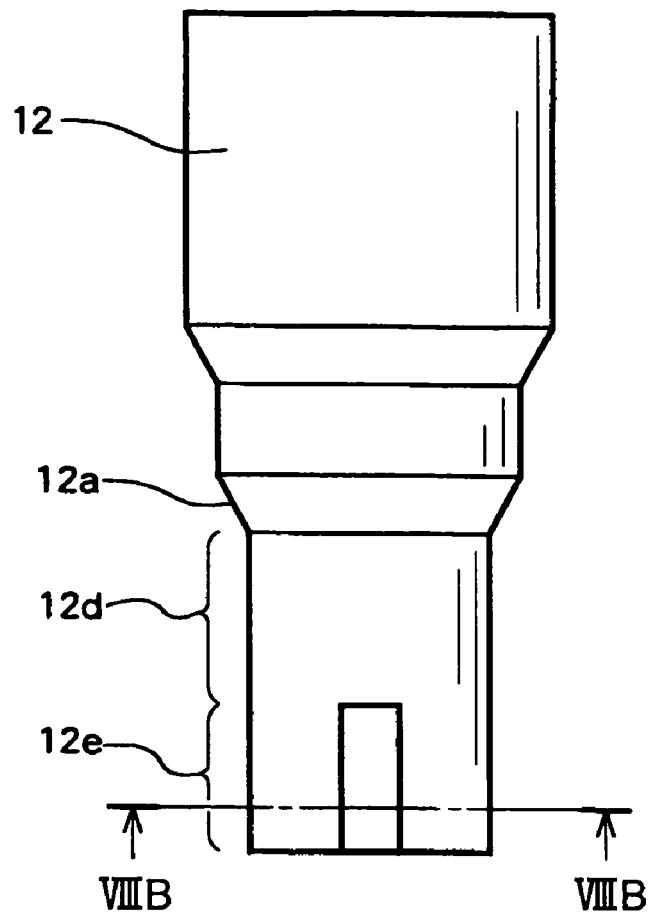
FIG. 8A is a schematic diagram showing a movable member of a direction control valve of a modified example of the FIG. 1 embodiment.
Figure 8B:
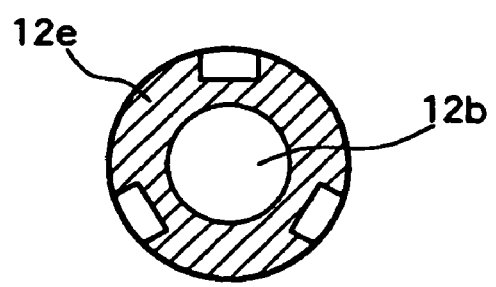
FIG. 8B is a sectional view showing the movable member of FIG. 8A taken along the line VIIIB-VIIIB.
Figure 9:
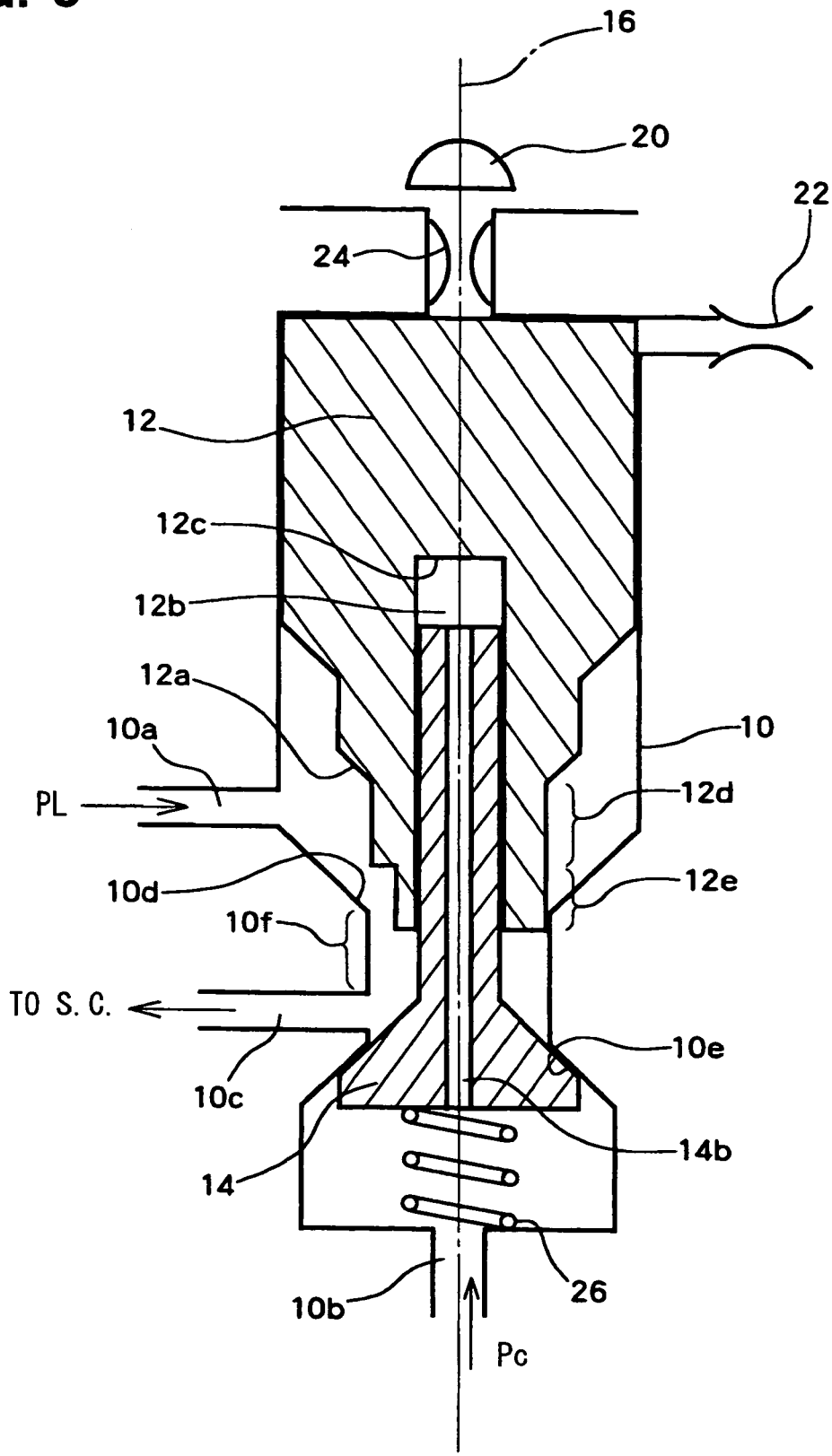
FIG. 9 is a schematic section diagram showing the direction control valve of the modified example of the FIG. 1 embodiment.

In an example structure shown in FIGS. 8A and 8B, the movable member 12 has a slide guide portion 12e formed at a position closer to the communication switching port 10b than the sliding block portion 12d with respect to the axial direction such that the slide guide portion 12e abuts the sliding block portion 12d. The slide guide portion 12e can slide on the inner peripheral face of the fitting portion 10f in the axial direction and is formed with a plurality of grooves extending on its outer peripheral face in the axial direction. The grooves define passages between the slide guide portion 12e and the fitting portion 10f to make the communication between the communication switching port 10a and the communication object port 10c when the slide guide portion 12e is fitted into the fitting portion 10f. Accordingly, when the distance between the seat 10d and the contact portion 12a of the movable member 12 becomes longer than the predetermined length L2 and the sliding block portion 12d comes out of the fitting portion 10f, the slide guide portion 12e makes the communication between the communication switching port 10a and the communication object port 10c while contacting the fitting portion 10f as shown in FIG. 9.

In the structure illustrated in FIGS. 1 and 2, the movable member 12 (sliding block portion 12d) completely comes out of the fitting portion 10f when the communication switching port 10a and the communication object port 10c communicate with each other. Therefore, there is a possibility that catch is caused when the sliding block portion 12d is inserted into the fitting portion 10f in the stroke of the movement of the movable member 12 in the second axial direction, resulting in hindering smooth sliding motion of the movable member 12. In contrast to this, in the structure illustrated in FIGS. 8A and 8B, even when the communication switching port 10a and the communication object port 10c communicate with each other, the movable member 12 (slide guide portion 12e) is inserted into and contacts the fitting portion 10f as shown in FIG. 9. Thus, catch can be prevented when the sliding block portion 12d is inserted into the fitting portion 10f in the stroke of the movement of the movable member 12 in the second axial direction, resulting in smooth sliding motion of the movable member 12.

Figure 10A:
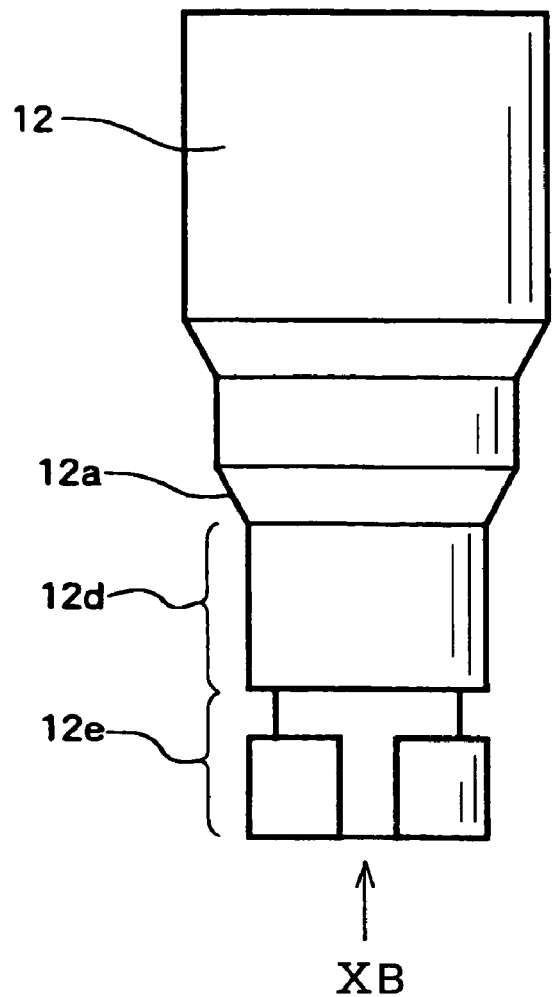
FIG. 10A is a schematic diagram showing a movable member of a direction control valve of another modified example of the FIG. 1 embodiment.
Figure 10B:
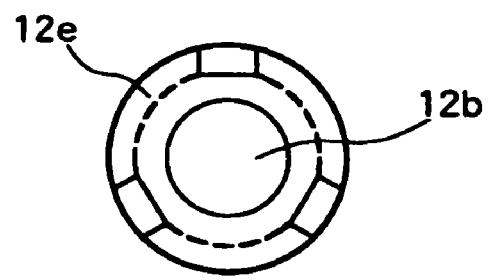
FIG. 10B is a schematic bottom diagram showing the movable member of FIG. 10A along the arrow mark XB.
Figure 11A:
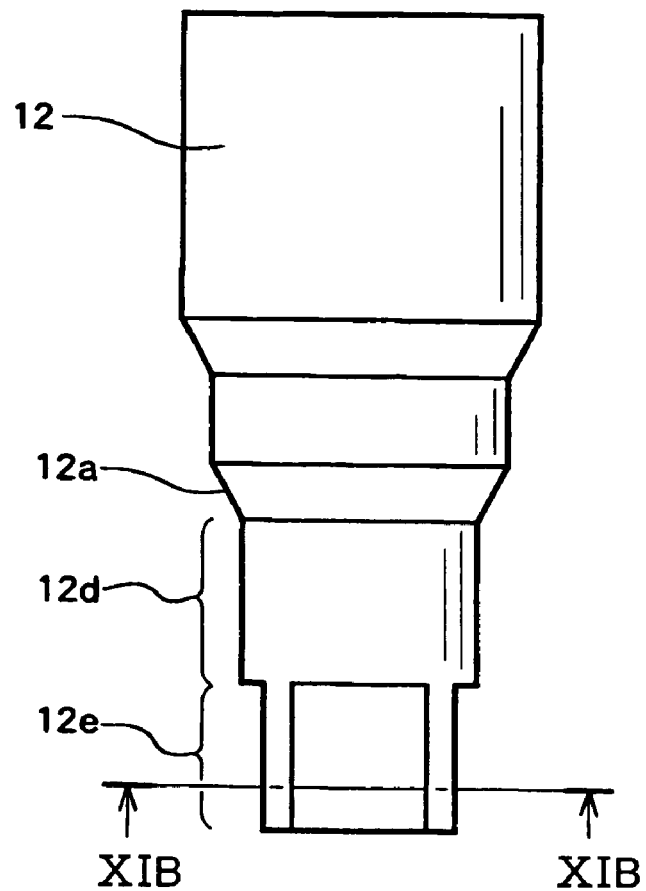
FIG. 11A is a schematic diagram showing a movable member of a direction control valve of yet another modified example of the FIG. 1 embodiment.
Figure 11B:
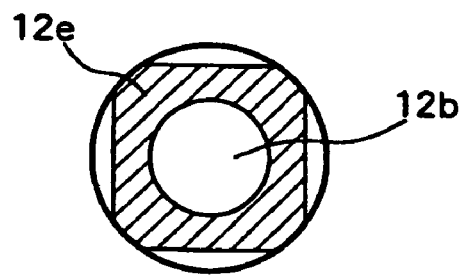
FIG. 11B is a schematic section diagram showing the movable member of FIG. 11A taken along the line XIB-XIB.

The shape of the groove formed on the outer peripheral face of the slide guide portion 12e is not limited to the shape illustrated in FIGS. 8A and 8B. For example, another groove extending in a circumferential direction of the slide guide portion 12e may be additionally formed as shown in FIGS. 10A and 10B. Alternatively, as illustrated in FIGS. 11A and 11B, the passage for achieving the communication between the communication switching port 10a and the communication object port 10c may be formed by partly shaping (tapering) the outer peripheral face of the slide guide portion 12e.

In the case where the sliding block portion 12d is provided on the movable member 14, the slide guide portion 12e may be provided at a position on the movable member 14 closer to the communication switching port 10b than the sliding block portion 12d with respect to the axial direction.

Figure 12:
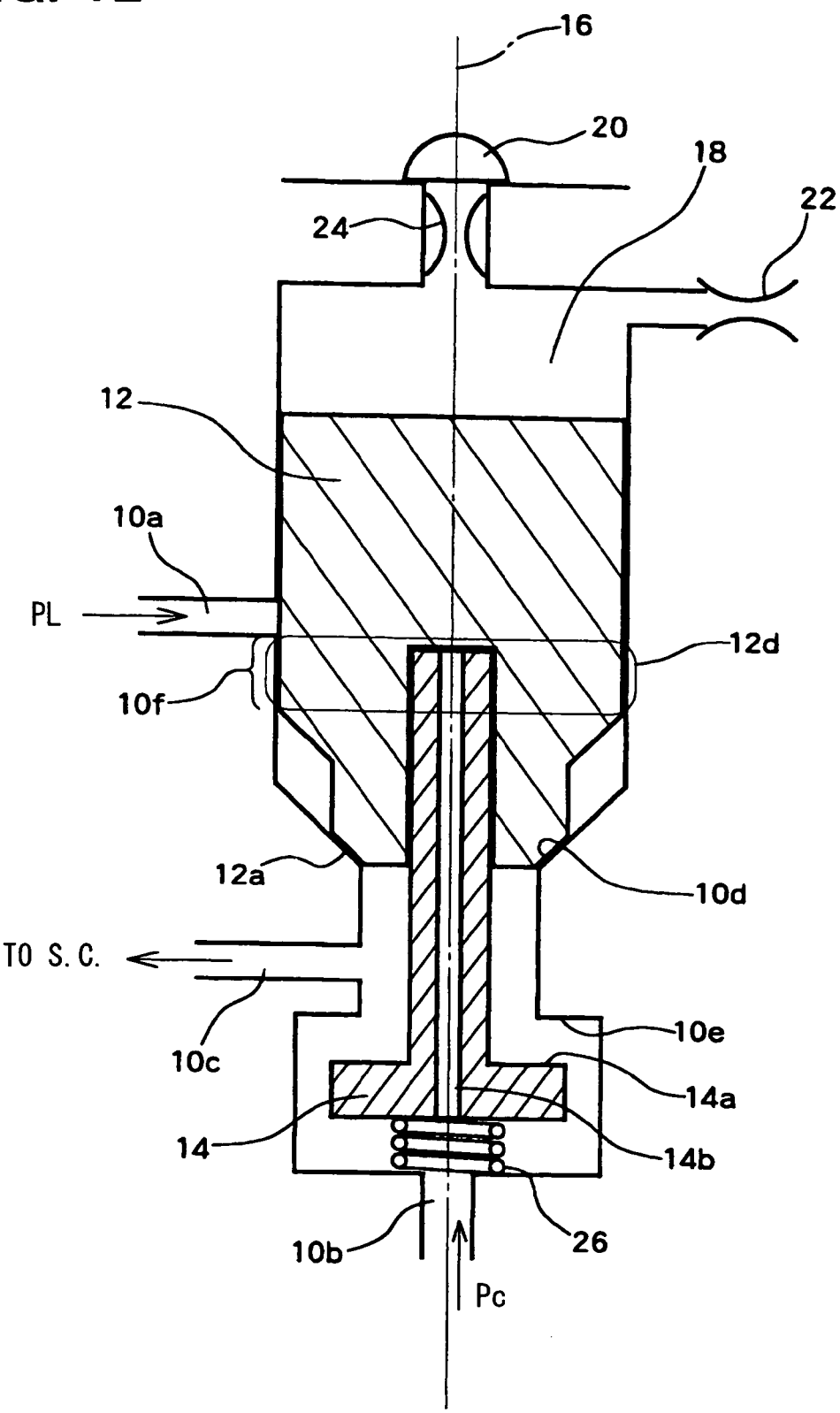
FIG. 12 is a schematic section diagram showing a direction control valve of a further modified example of the FIG. 1 embodiment.
Figure 13:
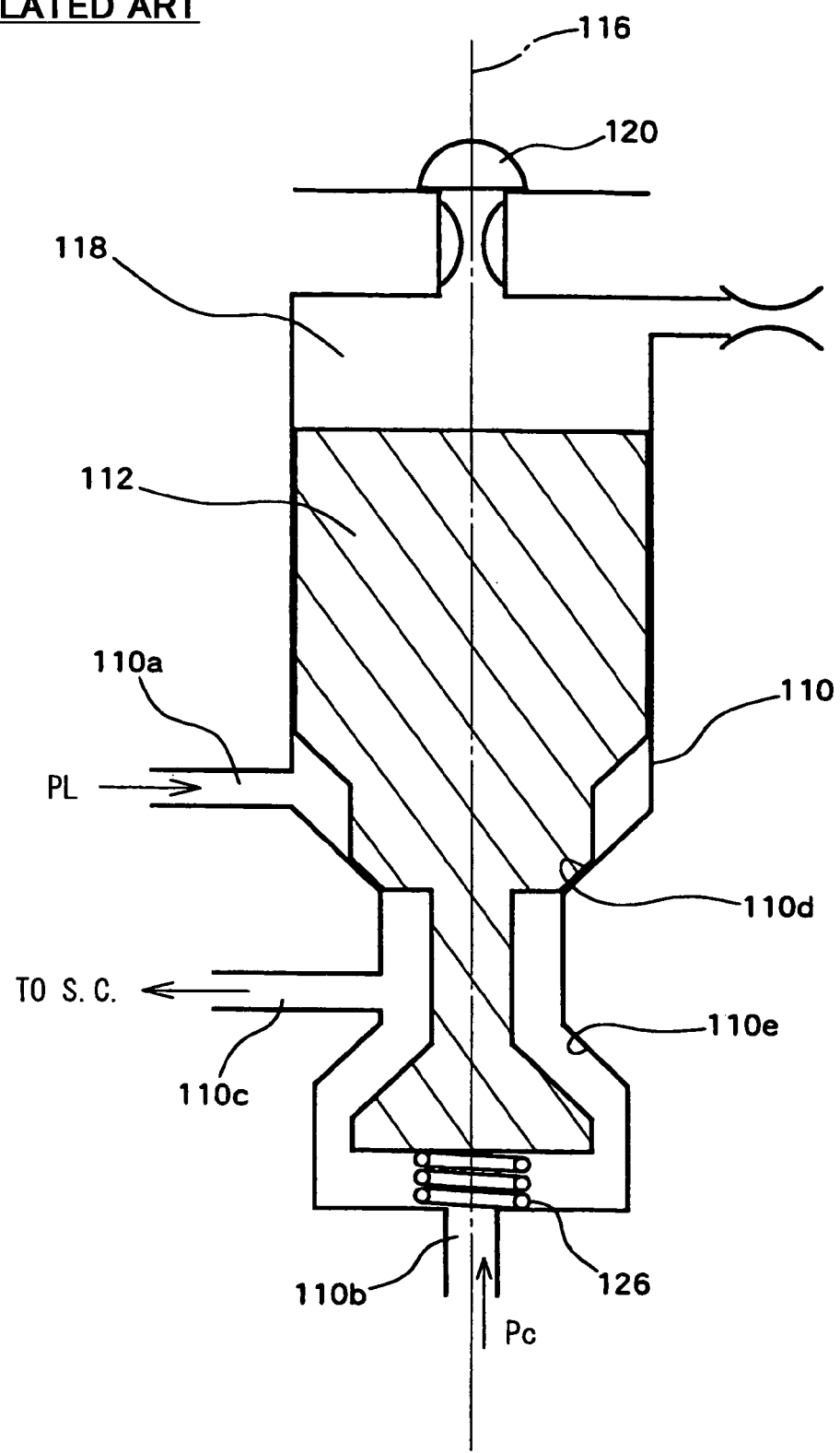
FIG. 13 is schematic section diagram showing an internal structure of a direction control valve of a related art.
Figure 14:
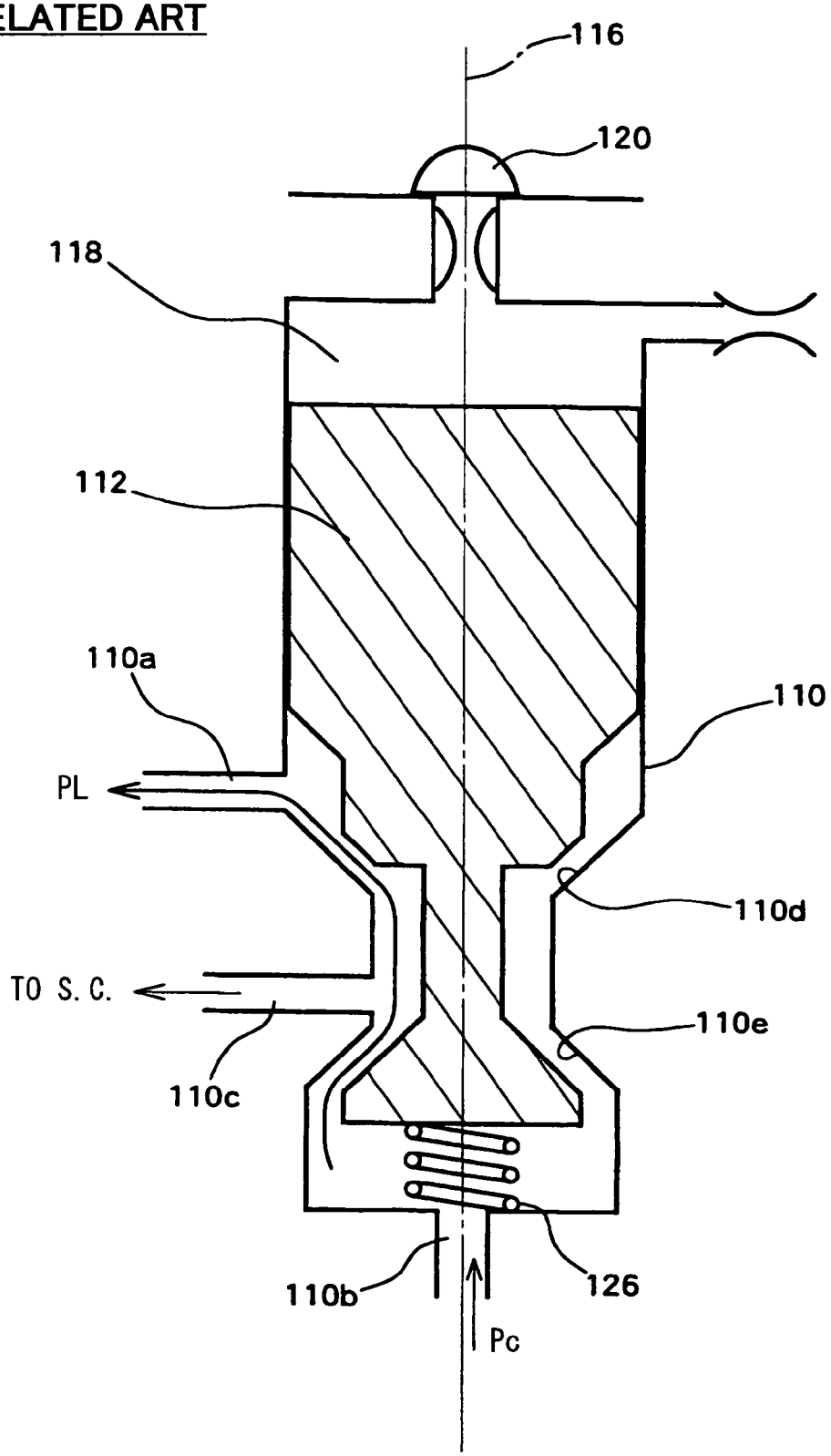
FIG. 14 is a schematic section diagram showing the direction control valve of FIG. 13.

In an example structure shown in FIG. 12, the sliding block portion 12d for blocking the communication between the communication switching port 10a and the communication object port 10c is formed at a position farther from the communication switching port 10b than the contact portion 12a of the movable member 12 with respect to the axial direction. The fitting portion 10f is provided between the communication switching port 10a and the seat 10d with respect to the axial direction. The sliding block portion 12d is fitted into the fitting portion 10f when the distance between the seat 10d and the contact portion 12a is equal to or shorter than the predetermined length L2. The sliding block portion 12d in this case has a diameter equal to the slide diameter (maximum diameter) of the movable member 12, with which the movable member 12 slides in the valve body 10. The sliding block portion 12d blocks the passage between the communication switching port 10a and the communication object port 10c in a position between the communication switching port 10a and the seat 10d with respect to the axial direction. The valve body 10 has a flat face serving as the seat 10e formed at a right angle with respect to the axial direction (axis 16). The movable member 14 has a flat face formed as the contact portion 14a at a right angle with respect to the axial direction and in parallel to the flat face of the seat 10e.

In the structure illustrated in FIGS. 1 and 2, the diameter of the sliding block portion 12d is smaller than the slide diameter (maximum diameter) of the movable member 12. The movable member 12 slides in the valve body 10 at two portions having different diameters, i.e., the maximum diameter portion and the slide blocking portion 12d. Therefore, the three portions of the two portions having different diameters and the contact portion 12a of the movable member 12 have to be formed concentrically with one another. In addition, the three portions have to be coaxial with the contact portion 14a of the movable member 14. Thus, the movable members 12, 14 require high accuracy of machining. In contrast to this, in the structure illustrated in FIG. 12, because the diameter of the sliding block portion 12d is equal to the slide diameter (maximum diameter) of the movable member 12 with respect to the valve body 10, the machining for achieving the concentricity of the sliding portions of the movable member 12 can be eliminated. Further, because the seat 10e of the valve body 10 and the contact portion 14a of the movable member 14 are both formed of flat faces at the right angle with respect to the axial direction, the contact portion 14a of the movable member 14 may not be coaxial with the movable member 12. In consequence, tolerances of measurements of the movable members 12, 14 can be increased.

In the description of the foregoing embodiments, the pressure in the control chamber 18 is controlled by the opening and closing control of the pilot valve 20 to control the thrust acting on the movable member 12. Alternatively, the thrust acting on the movable member 12 may be controlled by other methods than the opening and closing control of the pilot valve 20. For example, the thrust acting on the movable member 12 may be directly controlled by an electromagnetic force.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A direction control valve comprising:
a valve body formed with a first communication switching port, a second communication switching port and a communication object port; and
a movable member that moves in the valve body in an axial direction to switch a port communicating with the communication object port between the first communication switching port and the second communication switching port, the movable member including a first movable member that makes communication between the first communication switching port and the communication object port by moving in a first axial direction and that breaks the communication between the first communication switching port and the communication object port by moving in a second axial direction opposite to the first axial direction and a second movable member that makes communication between the second communication switching port and the communication object port by moving in the second axial direction and that breaks the communication between the second communication switching port and the communication object port by moving in the first axial direction, wherein
the first movable member has a pushing portion that contacts the second movable member in the second axial direction to apply a pushing force to the second movable member in the second axial direction,
the pushing portion is distant from the second movable member by a first predetermined distance with respect to the first axial direction when the communication between the first communication switching port and the communication object port is made and the communication between the second communication switching port and the communication object port is broken,
the first movable member pushes the second movable member in the second axial direction after the first movable member moves in the second axial direction by the first predetermined distance in a stroke in which the first and second movable members move in the second axial direction to break the communication between the first communication switching port and the communication object port and to make the communication between the second communication switching port and the communication object port due to a thrust acting on the first movable member in the second axial direction, the valve body has a first seat, which the first movable member contacts in the second axial direction to break the communication between the first communication switching port and the communication object port, and a second seat, which the second movable member contacts in the first axial direction to break the communication between the second communication switching port and the communication object port, the first movable member has a first contact portion that contacts the first seat in the second axial direction, the first or second movable member has a block portion that blocks and continues to block a passage between the first communication switching port and the communication object port when a distance between the first seat and the first contact portion is equal to, and when the distance between the first seat and the first contact portion is shorter than, a second predetermined distance, and the block portion makes the communication between the first communication switching port and the communication object port after the first contact portion moves away from the first seat in the first axial direction by more than the second predetermined distance in a stroke in which the first and second movable members move in the first axial direction to break the communication between the second communication switching port and the communication object port and to make the communication between the first communication switching port and the communication object port.

2. The direction control valve as in claim 1, wherein
the valve body has a fitting portion, into which the block portion is fitted when the distance between the first seat and the first contact portion is equal to or shorter than the second predetermined distance, and
the passage between the first communication switching port and the communication object port is blocked by fitting the block portion into the fitting portion.

3. The direction control valve as in claim 2, wherein
the first or second movable member has a slide guide portion that makes the communication between the first communication switching port and the communication object port while contacting the fitting portion when the distance between the first seat and the first contact portion is longer than the second predetermined distance.

4. The direction control valve as in claim 1, wherein
the first seat is provided between the first communication switching port and the communication object port with respect to the axial direction, and
the block portion blocks the passage between the first communication switching port and the communication object port at a position between the first seat and the communication object port with respect to the axial direction.

5. The direction control valve as in claim 1, wherein
the first seat is provided between the first communication switching port and the communication object port with respect to the axial direction, and
the block portion blocks the passage between the first communication switching port and the communication object port at a position between the first communication switching port and the first seat with respect to the axial direction.

6. The direction control valve as in claim 1, wherein
the block portion has a diameter equal to a slide diameter of the first movable member, with which the first movable member slides in the valve body.

7. The direction control valve as in claim 1, wherein
the block portion is provided on the first movable member, and
the second predetermined distance is set longer than a stroke distance of the axial movement of the second movable member.

8. The direction control valve as in claim 1, wherein
the second movable member has a second contact portion that contacts the second seat in the first axial direction,
the valve body has a flat face that is formed at a right angle with respect to the axial direction and that serves as the second seat, and
the second movable member has a flat face that is formed at a right angle with respect to the axial direction and that serves as the second contact portion.

9. The direction control valve as in claim 1, wherein
the first movable member is formed with an insertion hole, into which the second movable member is inserted in the first axial direction, and
the pushing portion is provided by a bottom face of the insertion hole.

10. The direction control valve as in claim 9, wherein
the second movable member is formed with a through hole to make communication between the second communication switching port and the insertion hole.

11. The direction control valve as in claim 1, further comprising:
a biasing device that applies a biasing force to the second movable member in the first axial direction, wherein
the port communicating with the communication object port is switched between the first communication switching port and the second communication switching port by adjusting the thrust acting on the first movable member in the second axial direction.

* * * * *